(12) United States Patent
Deng

(10) Patent No.: US 12,601,958 B2
(45) Date of Patent: Apr. 14, 2026

(54) APERTURE MODULE, CAMERA MODULE, AND ELECTRONIC DEVICE

(71) Applicant: VIVO MOBILE COMMUNICATION CO., LTD., Guangdong (CN)

(72) Inventor: Qiong Deng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 224 days.

(21) Appl. No.: 18/634,291

(22) Filed: Apr. 12, 2024

(65) Prior Publication Data

US 2024/0264509 A1    Aug. 8, 2024

Related U.S. Application Data

(63) Continuation of application No. PCT/CN2022/126592, filed on Oct. 21, 2022.

(30) Foreign Application Priority Data

Oct. 27, 2021    (CN) ......................... 202111256797.8

(51) Int. Cl.
*G03B 9/06*        (2021.01)
(52) U.S. Cl.
CPC ..................................... *G03B 9/06* (2013.01)
(58) Field of Classification Search
CPC ...................................................... G03B 9/06
See application file for complete search history.

(56) References Cited

U.S. PATENT DOCUMENTS

| | | | |
|---|---|---|---|
| 5,040,017 A * | 8/1991 | Arai | G03B 7/097 |
| | | | 396/493 |
| 6,102,554 A | 8/2000 | Wynne Willson et al. | |
| 10,931,857 B2 * | 2/2021 | Jun | G02B 27/646 |
| 12,001,074 B2 * | 6/2024 | Hu | G02B 5/005 |
| 2016/0139491 A1 | 5/2016 | Nakano et al. | |
| 2019/0137844 A1 | 5/2019 | Park et al. | |
| 2020/0028998 A1 | 1/2020 | Jun | |
| 2021/0109305 A1 | 4/2021 | Hu et al. | |
| 2022/0382128 A1 | 12/2022 | Lee | |

FOREIGN PATENT DOCUMENTS

| | | |
|---|---|---|
| CN | 204028531 U | 12/2014 |
| CN | 105607386 A | 5/2016 |
| CN | 209674160 U | 11/2019 |

(Continued)

*Primary Examiner* — Leon W Rhodes, Jr.
(74) *Attorney, Agent, or Firm* — Price Heneveld LLP

(57)        ABSTRACT

An aperture module, a camera module, and an electronic device are disclosed. The aperture module includes a base, a blade group, a gear carrier, and a driving member. A light passing hole is formed in the base. The blade group is disposed on the base and includes a plurality of blades. A light entering hole opposite to the light passing hole is formed among the plurality of blades. The driving member is connected to the gear carrier. The driving member is capable of driving the gear carrier to move relative to the base. In a process in which the gear carrier moves relative to the base, the gear carrier drives the blades in the blade group to rotate relative to the base in the direction towards or away from the center of the light entering hole, to adjust the size of the light entering hole.

15 Claims, 11 Drawing Sheets

(56)     References Cited

FOREIGN PATENT DOCUMENTS

| CN | 110737146 A | | 1/2020 |
|----|-------------|---|--------|
| CN | 111566555 A | | 8/2020 |
| CN | 112596321 A | | 4/2021 |
| CN | 113014766 A | | 6/2021 |
| CN | 113259545 A | | 8/2021 |
| CN | 113867075 A | | 12/2021 |
| JP | H08328080 A | | 12/1996 |
| JP | 2004038114 A | * | 2/2004 |
| JP | 2004096849 A | | 3/2004 |
| JP | 2004118033 A | | 4/2004 |
| JP | 2006317618 A | * | 11/2006 |
| JP | 2013029693 A | | 2/2013 |
| JP | 2020027230 A | | 2/2020 |

* cited by examiner

APERTURE MODULE, CAMERA MODULE, AND ELECTRONIC DEVICE

CROSS-REFERENCE TO RELATED APPLICATIONS

This is a continuation application of International Application No. PCT/CN2022/126592, filed on Oct. 21, 2022. International Application No. PCT/CN2022/126592 claims priority to Chinese patent application Ser. No. 202111256797.8, filed on Oct. 27, 2021 in China. Each of the above-listed applications is incorporated herein by reference in its entirety.

TECHNICAL FIELD

This application belongs to the technical field of communication devices, and specifically relates to an aperture module, a camera module, and an electronic device.

BACKGROUND

Apertures, commonly used in single-lens reflex cameras, each are used to adjust the size of a pore through which light passes. In combination with a shutter of a camera module, an amount of entering light can be determined, where the amount of entering light may affect a depth of field and imaging quality. Therefore, apertures play an important role in camera operation.

With the development of science and technologies, requirements on camera functions of electronic devices such as mobile phones and tablet computers are increasingly high, to achieve a camera effect close to that of a single-lens reflex camera. However, the overall architecture of an existing aperture used in a single-lens reflex device is too large to be used in these types of electronic devices. In the related art, an aperture that has only two adjustable gears but cannot achieve continuously variable aperture adjustment is provided, to improve the camera quality of these types of electronic devices in a manner of adding an aperture.

SUMMARY

An aperture module is provided, including a base, a blade group, a gear carrier, and a driving member, where a light passing hole is formed in the base;

the blade group is disposed on the base, the blade group includes a plurality of blades, the plurality of blades are distributed around the light passing hole, and a light entering hole opposite to the light passing hole is formed among the plurality of blades;

a gear is disposed on the blade, and the blade is capable of rotating around the gear in a direction towards or away from a center of the light entering hole;

the gear carrier is movably disposed on the base, the gear carrier is provided with a plurality of racks, and the gear carrier is meshed with the gears through the racks;

the driving member is connected to the gear carrier, and the driving member is capable of driving the gear carrier to move relative to the base; and in a process in which the gear carrier moves relative to the base, the gear carrier drives the blades in the blade group to rotate relative to the base in the direction towards or away from the center of the light entering hole, to adjust the size of the light entering hole.

Based on the camera module in this embodiment of this application, an embodiment of this application further provides an electronic device. The electronic device further includes the camera module according to any embodiment of the specification of this application.

Figure 1:
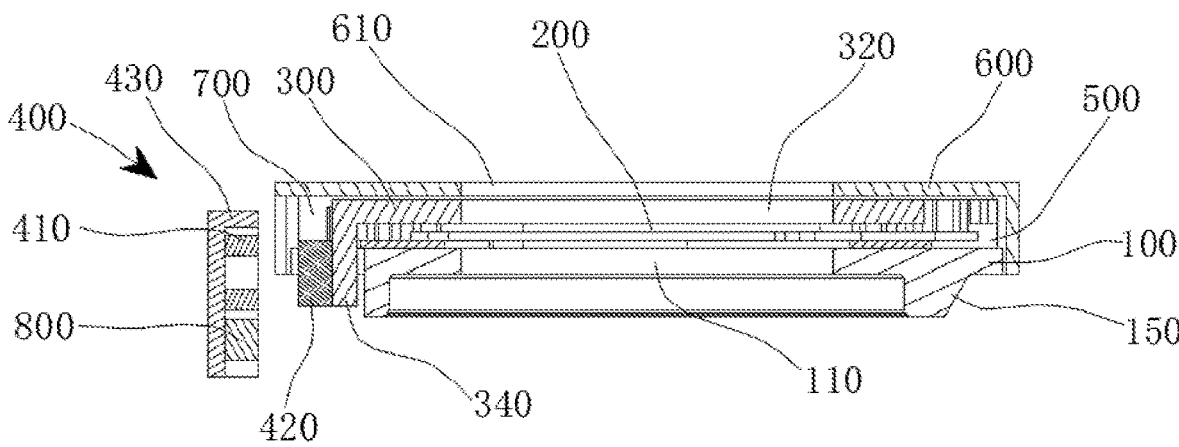
FIG. 1 is a sectional view of an aperture module according to an embodiment of this application.

Reference numerals are listed as follows: 100: base; 110: light passing hole; 120: protruding portion; 130: second avoidance opening; 140: rotating shaft; 150: positioning portion; 200: blade group; 210: blade; 211: light-shielding portion; 2111: arc-shaped notch; 212: gear; 2121: hinge hole; 220: light entering hole; 300: gear carrier; 310: rack; 320: first avoidance opening; 330: guide groove; 340: drive mounting block; 350: convex block; 400: driving member; 410: coil; 420: magnetic member; 430: fixed bracket; 500: mounting gap; 600: cover body; 610: third avoidance opening; 700: accommodating cavity; 800: sensor; 900: lens; 1000: housing; 1100: photosensitive chip.

DESCRIPTION OF EMBODIMENTS

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the quantity of objects is not limited. For example, there may be one or more first objects. In addition, in this specification and the claims, "and/or" represents at least one of connected objects, and a character "/" generally represents an "or" relationship between associated objects.

With reference to FIG. 1 to FIG. 15, an aperture module provided in embodiments of this application is described below in detail by using specific embodiments and application scenarios of the embodiments.

Figure 2:
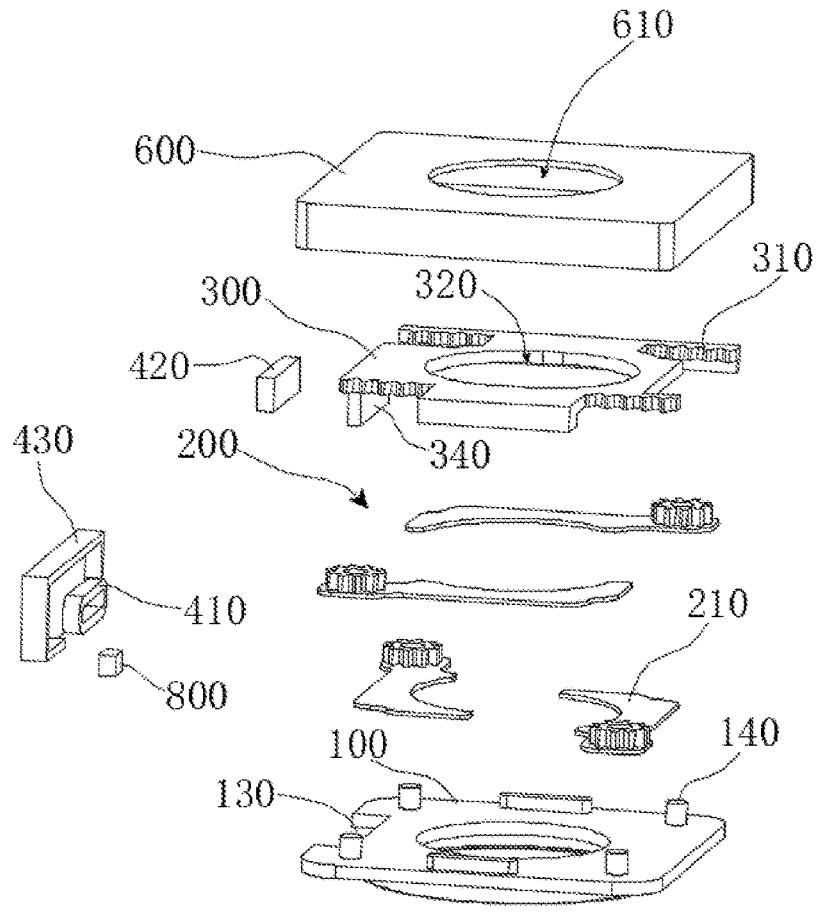
FIG. 2 is an exploded view of an aperture module according to an embodiment of this application.

With reference to FIG. 1 and FIG. 2, the aperture module in the embodiments of this application includes a base 100, a blade group 200, a gear carrier 300, and a driving member 400, wherein the base 100 is a basic structural member, and may provide an installation basis for the blade group 200, the gear carrier 300, and/or the driving member 400.

With reference to FIG. 3 to FIG. 8, a light passing hole 110 is formed in the base 100. The blade group 200 is disposed on the base 100. For example, the blade group 200 includes a plurality of blades 210. The plurality of blades 210 are distributed around the light passing hole 110. A light entering hole 220 opposite to the light passing hole 110 is formed among the plurality of blades 210. Optionally, shapes and sizes of the plurality of blades 210 are the same; and the plurality of blades 210 may be uniformly distributed around the light passing hole 110.

Figure 6:
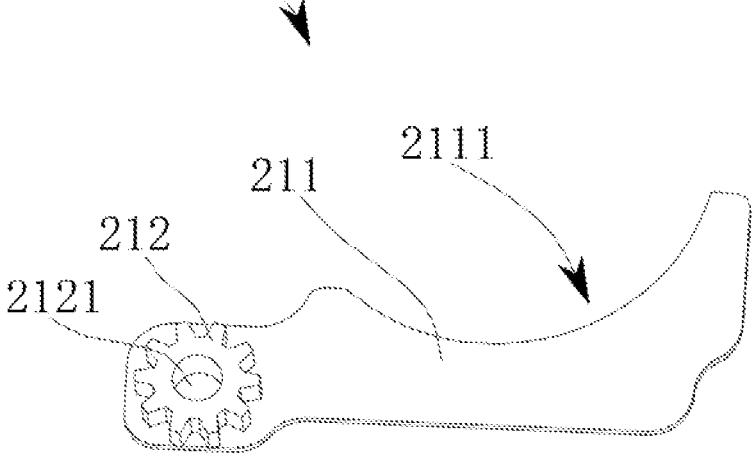
FIG. 6 is a schematic diagram of a blade according to an embodiment of this application.

With reference to FIG. 6, a gear 212 is disposed on the blade 210. The blade 210 is capable of rotating around the gear 212 in a direction towards or away from the center of the light entering hole 220, to adjust the size of the light entering hole 220. For example, the blade 210 is rotatably fitted to the base 100 through the gear 212. Optionally, one of the base 100 and the gear 212 is provided with a rotating shaft 140, the other one is provided with a hinge hole 2121, and the rotating shaft 140 is at least partially disposed in the hinge hole 2121.

The rotary fit between the gear 212 and the base 100 can be implemented in a plurality of manners. For example, the gear 212 and the base 100 may alternatively be connected to each other through a hinge, or the gear 212 is connected to the base 100 through a flexible material, so that rotation of the gear 212 relative to the base 100 is implemented through the deformation of the flexible material. Therefore, a specific manner of the rotary fit between the gear 212 and the base 100 is not limited in this embodiment.

Figure 3:
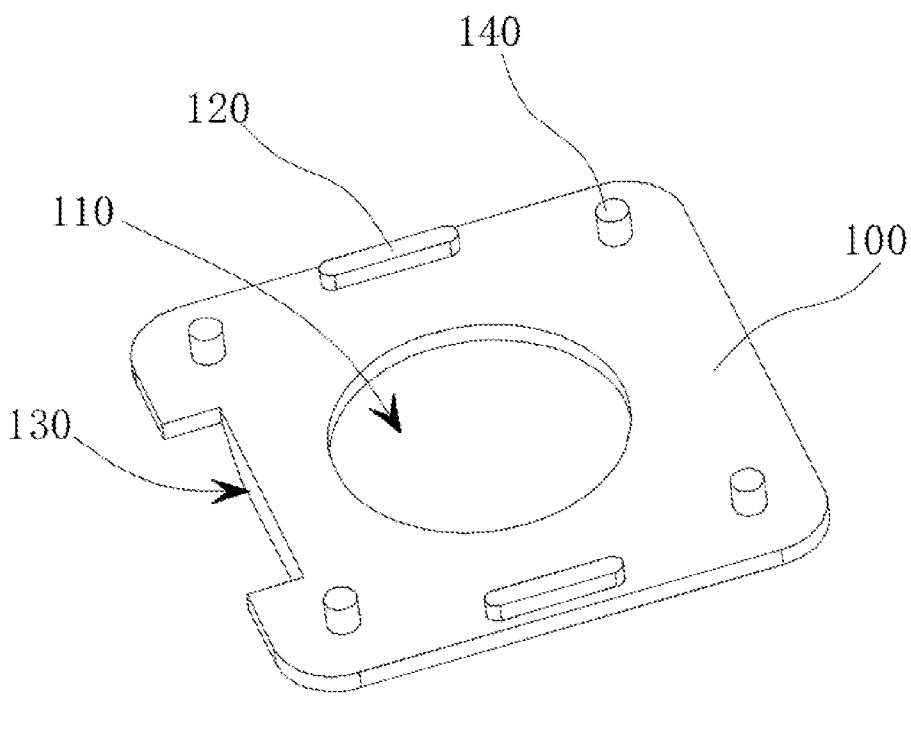
FIG. 3 is a schematic diagram of a base according to an embodiment of this application.
Figure 5:
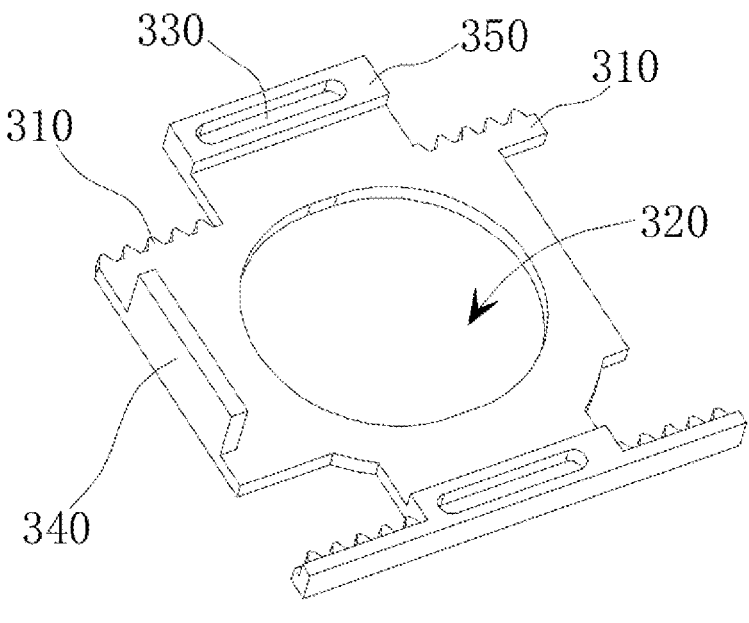
FIG. 5 is a schematic diagram of a gear carrier from a second viewing angle according to an embodiment of this application.

With reference to FIG. 3 and FIG. 5, the gear carrier 300 is movably disposed on the base 100. The gear carrier 300 is provided with a plurality of racks 310. The gear carrier 300 is meshed with the gears 212 through the racks 310. For example, quantities of the racks 310 and the gears 212 are the same; and the racks 310 are in a one-to-one correspondence with and meshed with the gears 212. Certainly, in another optional embodiment, each of at least some of the plurality of racks 310 may be matched with at least two gears 212, that is, one rack 310 may be meshed with at least two gears 212. Therefore, a relationship between the quantities of the racks 310 and the gears 212 is not limited in this embodiment.

The driving member 400 is connected to the gear carrier 300. The driving member 400 is capable of driving the gear carrier 300 to move relative to the base 100. In a process in which the gear carrier 300 moves relative to the base 100, the gear carrier 300 drives the blades 210 in the blade group 200 to rotate relative to the base 100 in the direction towards or away from the center of the light entering hole 220, to adjust the size of the light entering hole 220. For example, the gear carrier 300 drives the blades 210 in the blade group 200 to rotate relative to the base 100 in the direction towards the center of the light entering hole 220, so that the area of the light passing hole 110 shielded by the blades 210 is enlarged, and the light entering hole 220 is reduced. The gear carrier 300 drives the blades 210 in the blade group 200 to rotate relative to the base 100 in the direction away from the center of the light entering hole 220, so that the area of the light passing hole 110 shielded by the blades 210 is reduced, and the light entering hole 220 is enlarged.

Figure 13:
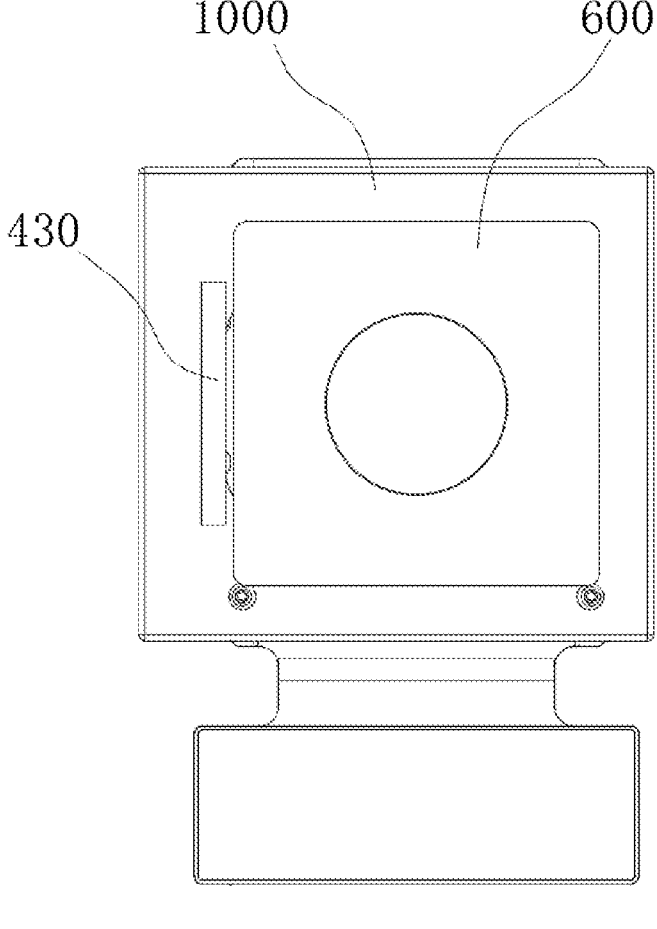
FIG. 13 is a schematic diagram of a camera module in a first state according to an embodiment of this application.
Figure 14:
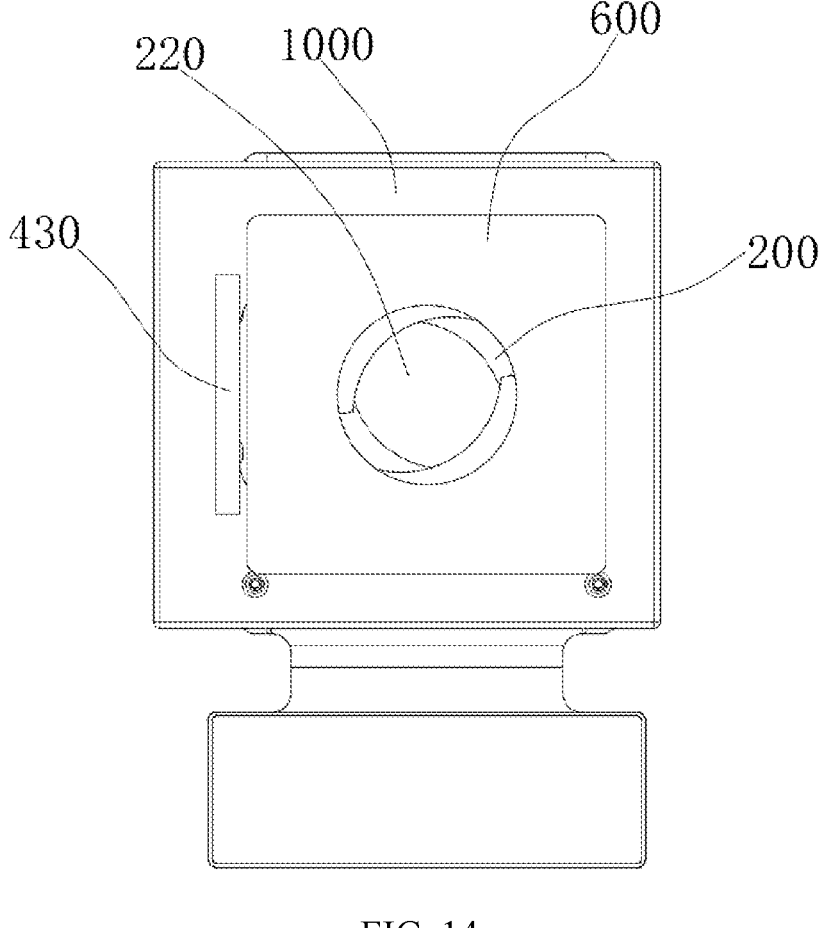
FIG. 14 is a schematic diagram of a camera module in a second state according to an embodiment of this application.
Figure 15:
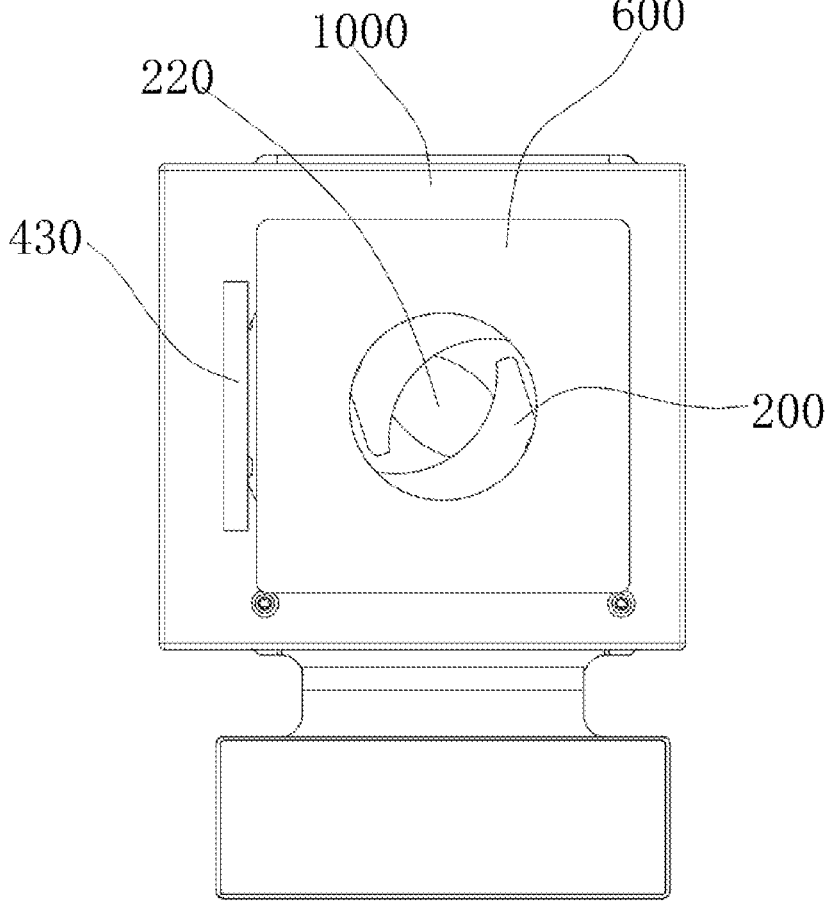
FIG. 15 is a schematic diagram of a camera module in a third state according to an embodiment of this application.

In the foregoing embodiment, the gear carrier 300 is provided with the plurality of racks 310, and the plurality of racks 310 may be respectively meshed with the gears 212, so that the gear carrier 300 can drive the plurality of blades 210 to rotate relative to the base 100 in a same direction. With reference to FIG. 13 to FIG. 15, in a process in which the plurality of blades 210 rotate relative to the base 100 in the direction towards the center of the light entering hole 220, the size of the light entering hole 220 defined by the plurality of blades 210 is reduced gradually. In a process in which the plurality of blades 210 rotate relative to the base 100 in the direction away from the center of the light entering hole 220, the size of the light entering hole 220 defined by the plurality of blades 210 is enlarged gradually.

For example, the driving member 400 drives the gear carrier 300 to move continuously relative to the base 100, that is, in a process in which the driving member 400 drives the gear carrier 300 to move relative to the base 100, the displacement of movement of the gear carrier 300 relative to the base 100 is changed continuously, so that the gear carrier 300 can drive the blades 210 to implement continuous adjustment of the size of the light entering hole 220.

Further, transmission between the racks 310 and the gears 212 is bidirectional, that is, the racks 310 can drive the gears 212 to rotate relative to the base 100 clockwise or counter-clockwise, so that the blades 210 can be driven to rotate towards or away from the center of the light entering hole 220, thereby enlarging or reducing the size of the light entering hole 220.

The foregoing solution is beneficial to implement a small dimension structure of the aperture module, so that the aperture module can be used in a camera module of a small electronic device, for meeting camera requirements of small electronic devices. For example, the small electronic device may be a mobile phone, a watch, a vehicle-mounted display, a tablet computer, an e-book reader, a medical instrument, or the like.

With reference to FIG. 4 to FIG. 7, the plurality of racks 310 are disposed in parallel, and rack grooves corresponding to the plurality of racks 310 face the same direction. Because the plurality of racks 310 on the gear carrier 300 face the same direction, the gears 212 meshed with the racks 310 on the same gear carrier 300 can rotate relative to the base 100 in the same direction under the action of the racks 310, that is, the gears 212 meshed with the racks 310 on the gear carrier 300 rotate relative to the base 100 in the same clockwise or counter-clockwise direction under the action of the gear carrier 300. Therefore, the blades 210 move towards or away from the center of the light entering hole 220 synchronously. Preferably, the teeth structure of the gear 212 may be a circular arc-shaped rack segment. Certainly, the teeth structure may alternatively be a ring-shaped rack segment. Specifically, the size of a central angle corresponding to the rack segment can be adjusted based on the range of rotation angles of the blades 210 relative to the base 100. Therefore, the size of the central angle corresponding to the circular arc-shaped rack segment is not limited in this application. Further, the radii of gears 212 corresponding to different blades 210 are the same, so that speeds by which the blades 210 move relative to the center of the light entering hole 220 are the same.

Figure 4:
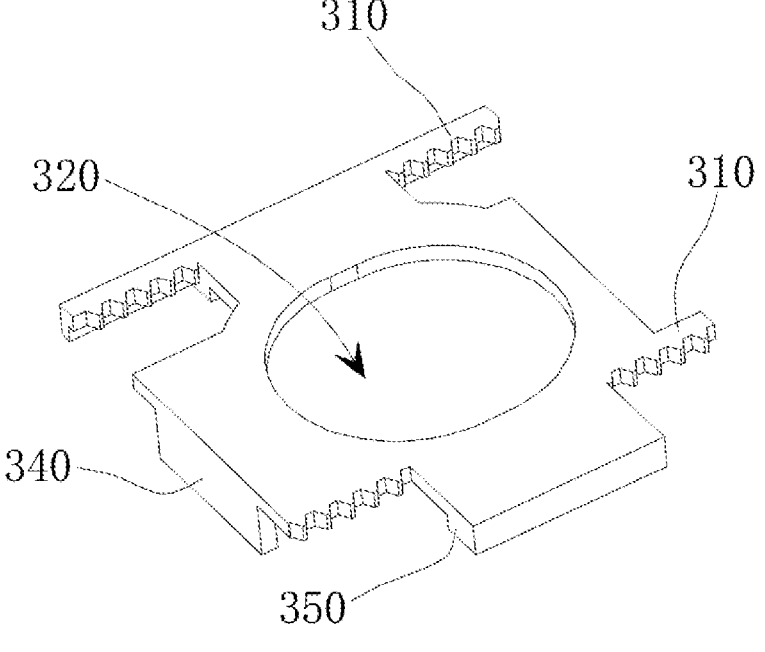
FIG. 4 is a schematic diagram of a gear carrier from a first viewing angle according to an embodiment of this application.

With reference to FIG. 1, FIG. 4, and FIG. 5, the gear carrier 300 has a first avoidance opening 320, the gear carrier 300 and the base 100 are superposed in a light passing direction of the light passing hole 110, the first avoidance opening 320 is opposite to the light passing hole 110, there is a mounting gap 500 between the gear carrier 300 and the base 100, and the blade group 200 is disposed in the mounting gap 500. Because the blade group 200 is disposed in the mounting gap 500, the mounting gap 500 can not only protect the blade group 200, but also provide a guide function for the movement of the blade group 200 relative to the base 100, for preventing the blades 210 from shaking in the light passing direction of the light passing hole 110, and ensuring light blocking performance at the joint of two blades.

The light passing direction of the light passing hole 110 in this application is the axial direction of the light passing hole 110. For example, two sides of the blade group 200 are in sliding fit with the base 100 and the gear carrier 300 respectively, so that the blades 210 can slide along the base 100 or the surface of the gear carrier 300, thereby preventing the blades 210 from shaking in the light passing direction of the light passing hole 110. For example, in a case that the aperture module is used in a camera module, the light passing direction of the light passing hole 110 may be an optical axis direction of the camera module.

Figure 7:
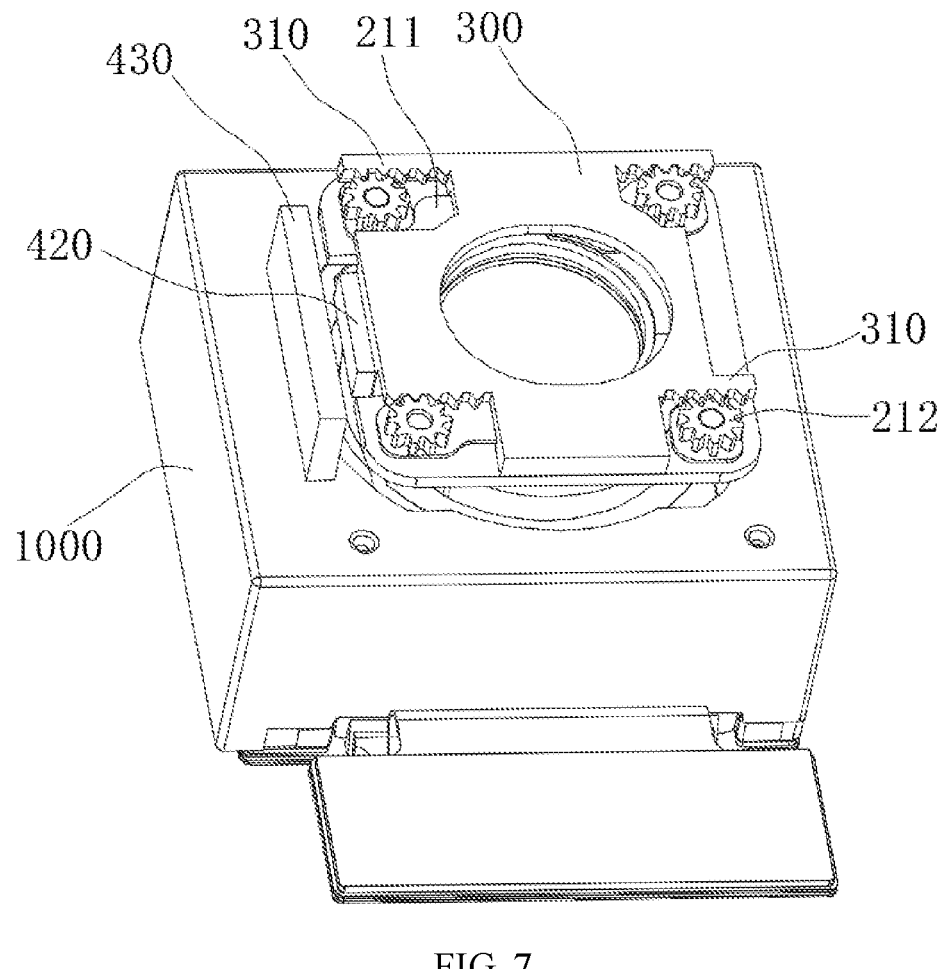
FIG. 7 is a schematic diagram of assembly of a gear carrier and a blade group according to an embodiment of this application.

With reference to FIG. 4 and FIG. 7, in an optional embodiment, the diameter of the first avoidance opening 320 is greater than the diameter of the light passing hole 110. For example, the first avoidance opening 320 may be provided as an oval through hole, and the length of a short axis corresponding to the first avoidance opening 320 is not less than the diameter of the light passing hole 110. Further, a long axis corresponding to the first avoidance opening 320 is parallel to the rack 310, to prevent the gear carrier 300 from shielding the light passing hole 110.

With reference to FIG. 5, the side of the gear carrier 300 facing the base 100 is provided with a convex block 350, the convex block 350 is supported by the base 100, and a mounting gap 500 is formed between the gear carrier 300 and the base 100; and/or the side of the base 100 facing the gear carrier 300 is provided with a convex block 350, the convex block 350 is supported by the gear carrier 300, and a mounting gap 500 is formed between the base 100 and the gear carrier 300. Optionally, the blade 210 includes a light-shielding portion 211, the light-shielding portion 211 is connected to the gear 212, and the gear 212 is capable of driving the light-shielding portion 211 to rotate along the mounting gap 500 in a direction towards or away from the center of the light entering hole 220.

For example, the dimension of the mounting gap 500 in the light passing direction of the light passing hole 110 is not less than the dimension of the light-shielding portion 211 in the light passing direction of the light passing hole 110, so as to avoid increasing the resistance to movement of the blade group 200 relative to the base 100 and the gear carrier 300 because the distance between the gear carrier 300 and the base 100 is too small. For example, in a case that the size of the light entering hole 220 reaches a maximum value, at least one blade 210 is abutted on the convex block 350, to limit the maximum distance between the blade 210 and the center of the light entering hole 220 through the convex block 350.

With reference to FIG. 3 and FIG. 5, one of the base 100 and the gear carrier 300 is provided with a guide groove 330, the guide groove 330 is disposed parallel to the rack 310, the other one is provided with a protruding portion 120, the protruding portion 120 is at least partially disposed in the guide groove 330, and the protruding portion 120 is capable of sliding along the guide groove 330. In a process in which the driving member 400 drives the gear carrier 300 to slide along the base 100, the protruding portion 120 slides along the guide groove 330, so that the movement of the gear carrier 300 in the extending direction of the rack 310 can be limited through the protruding portion 120 and the guide groove 330, to avoid the failure of meshing between the rack 310 and the gear 212.

For example, the guide groove 330 may be disposed on the convex block 350, so that the thickness of the aperture module can be reduced without increasing the thicknesses of the base 100 and the gear carrier 300, which helps reducing the size of the aperture module.

In another optional embodiment, in a case that the thicknesses/thickness of the base 100 and/or the gear carrier 300 are/is large enough to groove, the guide groove 330 can be formed in the base 100 and/or the gear carrier 300. Further, the protruding portion 120 may be used as the convex block 350. For example, the dimension of the protruding portion 120 in the light passing direction of the light passing hole 110 is greater than the depth of the guide groove 330, so that the protruding portion 120 can support the base 100 and the gear carrier 300, to form the mounting gap 500 between the base 100 and the gear carrier 300.

With reference to FIG. 3 and FIG. 5, in an optional embodiment, there are two guide grooves 330 and two protruding portions 120. For example, the two guide grooves 330 are parallelly disposed on two sides of the gear carrier 300, and the two protruding portions 120 are parallelly disposed on two sides of the base 100, to avoid stuttering when the protruding portions 120 slide along the guide grooves 330.

With reference to FIG. 1 and FIG. 2, the driving member 400 includes a coil 410 and a magnetic member 420, one of the coil 410 and the magnetic member 420 is connected to the base 100, the other one is connected to the gear carrier 300, the coil 410 drives the magnetic member 420 to move relative to the base 100, and the magnetic member 420 drives the gear carrier 300 to move. For example, the magnetic member 420 may be a component that generates a magnetic field. For example, the magnetic member 420 may be a permanent magnet or an electromagnet coil. In this embodiment, mutually attractive or repulsive action forces can be generated between the coil 410 and the magnetic member 420 by controlling the amount of current passing through the coil 410. Specifically, in a case that mutually attractive action forces are generated between the coil 410 and the magnetic member 420, the coil 410 and the magnetic member 420 get close to each other, thereby driving the gear carrier 300 to move relative to the base 100 in a first direction. In a case that mutually repulsive action forces are generated between the coil 410 and the magnetic member 420, the coil 410 and the magnetic member 420 move away from each other, thereby driving the gear carrier 300 to move relative to the base 100 in a second direction, where the second direction and the first direction are opposite. In other words, the coil 410 and the magnetic member 420 can drive the gear carrier 300 to reciprocate relative to the base 100, thereby driving, through the gear carrier 300, the blade 210 to rotate relative to the base 100. Therefore, continuous adjustment of the size of the light entering hole 220 is implemented.

With reference to FIG. 1, in an optional example, the coil 410 or the magnetic member 420 is disposed on a side wall of the gear carrier 300, to avoid the coil 410 or the magnetic member 420 to increase the thickness of the aperture module. In a case that the aperture module is used in a small electronic device, the aperture module in the foregoing solution can further help reducing the thickness of the small electronic device. This adapts to the trend of lightening and thinning development of small electronic devices.

With reference to FIG. 1 and FIG. 2, the gear carrier 300 has a drive mounting block 340, and the drive mounting block 340 protrudes towards the base 100. The base 100 has a second avoidance opening 130. The second avoidance opening 130 is opposite to the drive mounting block 340. The drive mounting block 340 is at least partially disposed in the second avoidance opening 130. In a case that the gear carrier 300 moves relative to the base 100, the drive mounting block 340 moves along the second avoidance opening 130. For example, the drive mounting block 340 is flush with a side wall of the gear carrier 300, to enlarge the area of a mounting surface of the coil 410 or the magnetic member by using the side wall of the gear carrier 300. The second avoidance opening 130 provides a sufficient avoidance space to increase the area of the side wall of the drive mounting block 340, which can further enlarge the area of the mounting surface of the coil 410 or the magnetic member 420. According to the solution in the foregoing embodiment, the area of the mounting surface of the coil 410 or the magnetic member 420 can be enlarged without increasing the overall thickness of the aperture module, thereby preventing the driving member 400 from increasing the thickness of the aperture module. In a case that the aperture module is used in a small electronic device, the aperture module in the foregoing solution can further help reducing the thickness of the small electronic device. This adapts to the trend of lightening and thinning development of small electronic devices.

With reference to FIG. 6, the side of the light-shielding portion 211 close to the light entering hole 220 is provided with an arc-shaped notch 2111, the arc-shaped notches 2111 in the plurality of blades 210 form the light entering hole 220, and the center of the light entering hole 220 coincides with the center of the light passing hole 110. In this embodiment, the roundness of the light entering hole 220 can be improved by setting the arc-shaped notch 2111, so that the adjustment of the amount of entering light by the aperture module can be further improved.

Figure 8:
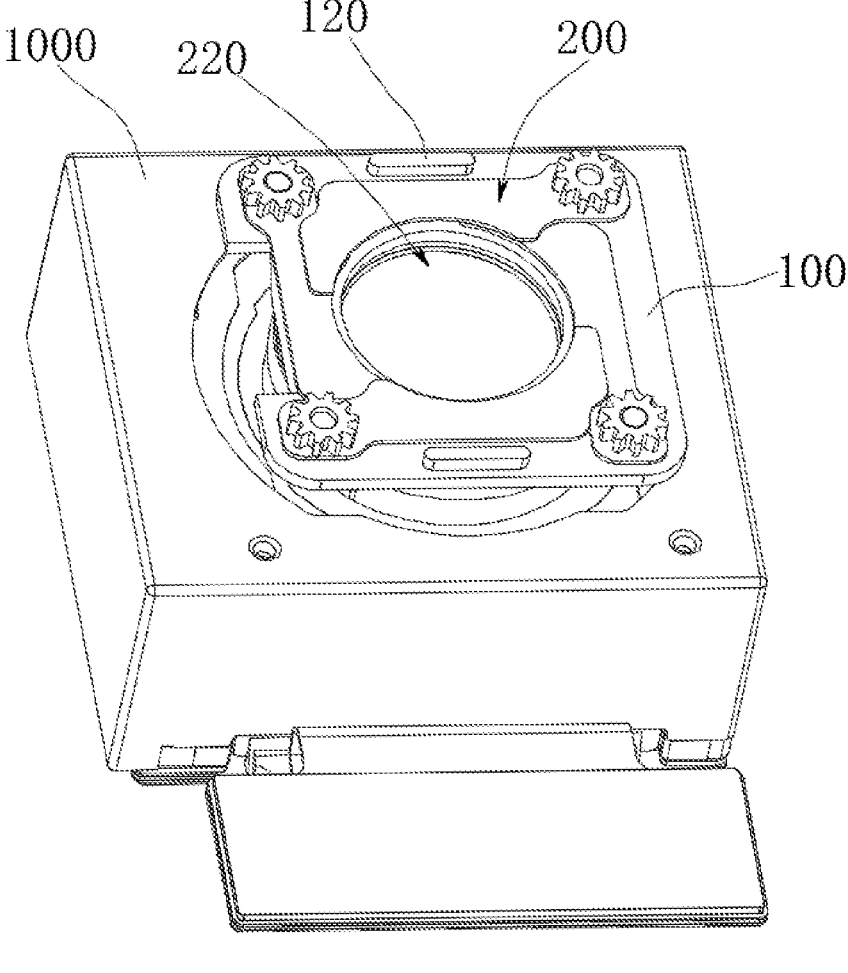
FIG. 8 is a schematic diagram of assembly of a blade group and a base according to an embodiment of this application.
Figure 9:
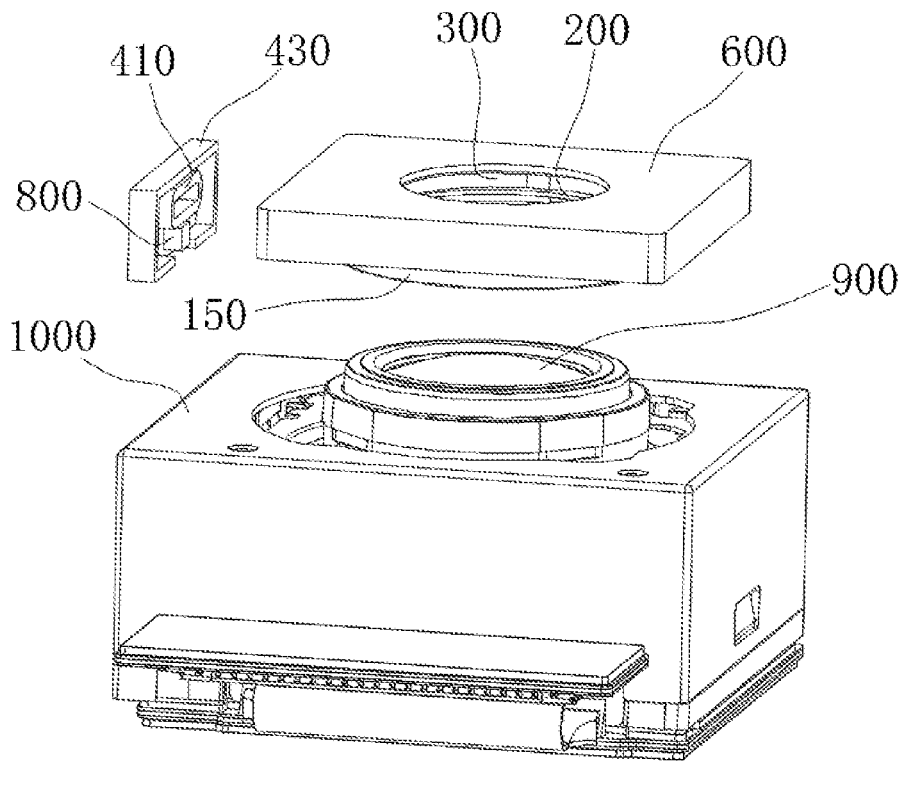
FIG. 9 is a schematic diagram of assembling an aperture module with a lens according to an embodiment of this application.
Figure 10:
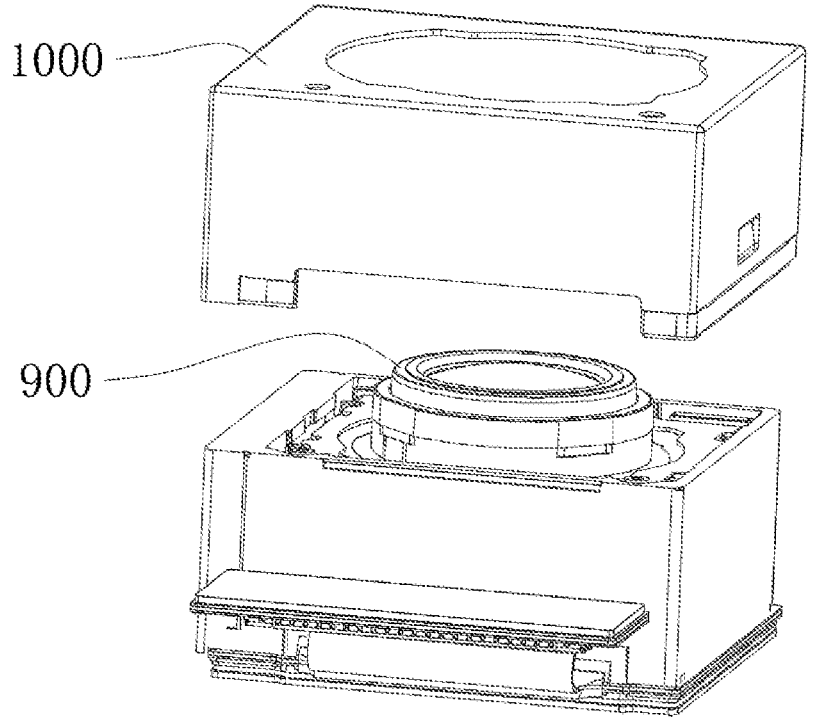
FIG. 10 is a schematic diagram of assembling a housing with a lens according to an embodiment of this application.

With reference to FIG. 8, as an optional embodiment, there may be four blades 210. Further, the four blades 210 may be uniformly distributed around the light passing hole 110. For example, in a case that the size of the light entering hole 220 is a maximum value, the blades 210 may be superimposed in the light passing direction of the light passing hole 110. With reference to FIG. 8, the distances between two opposite blades 210 and the base 100 are the same.

In an optional embodiment, the roundness of the light entering hole 220 can be increased by increasing the quantity of blades 210. It should be noted that, a person skilled in the art may set the quantity of blades 210 according to actual requirements. Therefore, a specific quantity of blades 210 is not limited in this embodiment.

In an optional embodiment, the aperture module further includes a cover body 600. The cover body 600 covers the base 100. An accommodating cavity 700 is formed between the cover body 600 and the base 100. The blade group 200 and the gear carrier 300 are disposed in the accommodating cavity 700. For example, the cover body 600 may be fixedly connected to the base 100. Optionally, the cover body 600 may be fixed to the base 100 by using a screw, a buckle, or a latch, or via bonding. With reference to FIG. 1, the cover body 600 has a third avoidance opening 610, and the third avoidance opening 610 is opposite to the light passing hole 110. Optionally, the size of the third avoidance opening 610 is the same as the size of the light passing hole 110.

With reference to FIG. 1 and FIG. 2, the aperture module further includes a sensor 800. The sensor 800 is configured to sense displacement of movement of the gear carrier 300 relative to the base 100. For example, the sensor 800 may be a distance sensor, configured to determine a location of the gear carrier 300 by sensing information about the distance between a specific point in the gear carrier 300 and the sensor 800 and processing the information about the distance.

For example, the gear carrier 300 is provided with a positioning magnetic member. The sensor 800 may be a Hall sensor, configured to determine a location of the gear carrier 300 by sensing the magnetic field intensity of a location where the sensor 800 is and processing the sensed magnetic field intensity. For example, the positioning magnetic member may be a permanent magnet. Further, the positioning magnetic member and the magnetic member 420 are a same component.

Figure 11:
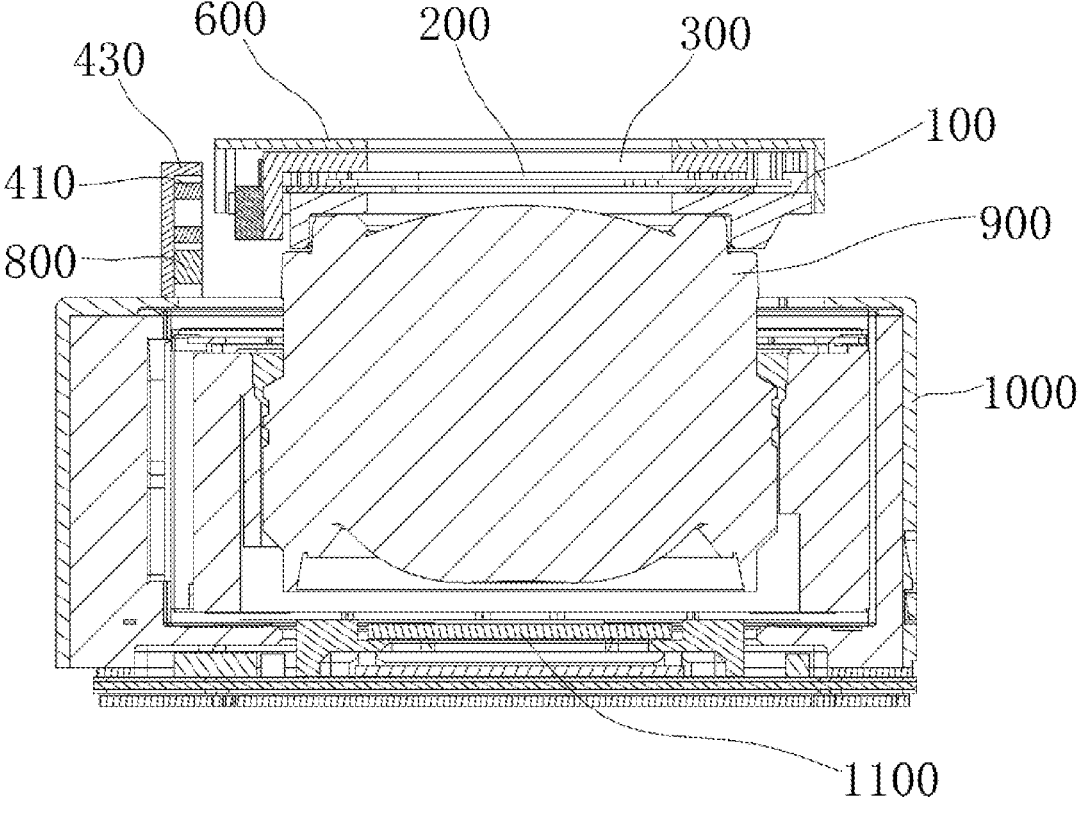
FIG. 11 is a sectional view of a camera module according to an embodiment of this application.

With reference to FIG. 1, FIG. 2, and FIG. 11, the driving member 400 further includes a fixed bracket 430, the coil 410, or the magnetic member 420. For example, the coil 410 may be fixedly disposed on the fixed bracket 430. The magnetic member 420 is fixedly disposed on the drive mounting block 340. There are a plurality of manners of fixing the coil 410 and the magnetic member 420, wherein the coil 410 may be disposed on the fixed bracket 430 via bonding, buckling, embedding, and the like. The magnetic member 420 may be fixed to the drive mounting block 340 via bonding, screwing, buckling, or the like. Therefore, specific manners of fixing the coil 410 and the magnetic member 420 are not limited in this embodiment.

Based on the aperture module disclosed in this embodiment of this application, an embodiment of this application further provides a camera module. For example, the camera module includes the aperture module according to any embodiment of the specification of this application, so that continuous adjustment of the amount of passing light can be implemented by using the aperture module, thereby optimizing the shooting performance of the camera module.

With reference to FIG. 11, the camera module further includes a lens 900. The aperture module is disposed on the lens 900. The framing channel of the lens 900 is opposite to the light entering hole 220. It should be noted that, the framing channel of the lens 900 is a channel through which light enters the lens 900 in a shooting process of the camera module.

In an optional embodiment, an optical axis corresponding to the lens 900 passes through the center of the light entering hole 220.

Figure 12:
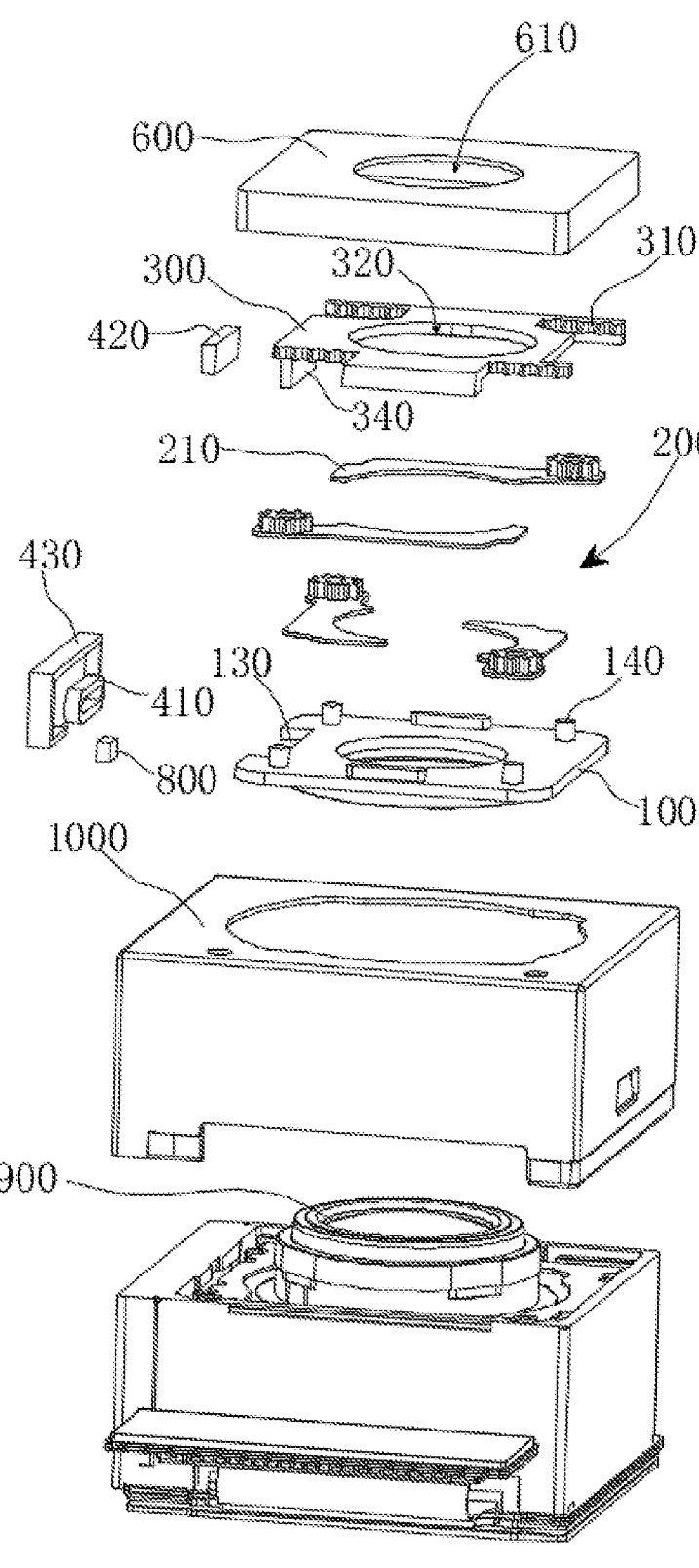
FIG. 12 is an exploded view of a camera module according to an embodiment of this application.

With reference to FIG. 11 and FIG. 12, the camera module further includes a housing 1000 and a photosensitive chip 1100. For example, the lens 900 and the photosensitive chip 1100 are disposed in the housing 1000. Further, the photosensitive chip 1100 may be disposed opposite to the framing channel of the lens 900, so that the photosensitive chip 1100 can receive light entering the lens through the framing channel.

In an optional embodiment, the side of the base 100 close to the lens 900 is provided with a positioning portion 150. The positioning portion 150 is disposed in the axial direction of the lens 900. The positioning portion 150 is abutted on a side wall at the periphery of the lens 900. Further, the coil 410 or the magnetic member 420 may be fixedly disposed on the lens 900 and/or the housing 1000, so that the coil 410 or the magnetic member 420 can be fixedly disposed relative to the base 100. For example, the coil 410 or the magnetic member 420 may be fixed on the housing 1000 or the lens 900 through the fixed bracket 430. Specifically, the fixed bracket 430 and the housing 1000/the lens 900 may be an integral structure, or the fixed bracket 430 may be fixedly connected to the housing 1000 or the lens 900 via bonding, screwing, buckling, or the like.

Based on the camera module disclosed in this embodiment of this application, an embodiment of this application further discloses an electronic device. The electronic device includes the camera module according to any one of the foregoing embodiments.

The electronic device disclosed in this embodiment of this application may be a mobile phone, a watch, a vehicle-mounted display, a tablet computer, an e-book reader, a medical instrument, and the like. A specific type of the electronic device is not limited in this embodiment of this application.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. An aperture module, comprising a base, a blade group, a gear carrier, and a driving member, wherein a light passing hole is formed in the base;

the blade group is disposed on the base, the blade group comprises a plurality of blades, the plurality of blades are distributed around the light passing hole, and a light entering hole opposite to the light passing hole is formed among the plurality of blades;

for each blade, a gear is disposed on the blade, and the blade is capable of rotating around the gear in a direction towards or away from a center of the light entering hole;

the gear carrier is movably disposed on the base, the gear carrier is provided with a plurality of racks, and the gear carrier is meshed with the gears through the racks; wherein the plurality of racks are disposed in parallel, and rack grooves corresponding to the plurality of racks face the same direction;

the driving member is connected to the gear carrier, and the driving member is capable of driving the gear carrier to move relative to the base; and in a process in which the gear carrier moves relative to the base, the gear carrier drives the blades in the blade group to rotate relative to the base in the direction towards or away from the center of the light entering hole, so as to adjust a size of the light entering hole.

2. The aperture module according to claim 1, wherein the gear carrier has a first avoidance opening, the gear carrier and the base are superposed in a light passing direction of the light passing hole, the first avoidance opening is opposite to the light passing hole, there is a mounting gap between the gear carrier and the base, and the blade group is disposed in the mounting gap.

3. The aperture module according to claim 2, wherein the side of the gear carrier facing the base is provided with a convex block, the convex block is supported by the base, and a mounting gap is formed between the gear carrier and the base; and/or the side of the base facing the gear carrier is provided with a convex block, the convex block is supported by the gear carrier, and a mounting gap is formed between the base and the gear carrier; and the blade comprises a light-shielding portion, the light-shielding portion is connected to the gear, and the gear is capable of driving the light-shielding portion to rotate along the mounting gap in a direction towards or away from the center of the light entering hole.

4. The aperture module according to claim 1, wherein one of the base and the gear carrier is provided with a guide groove, the guide groove is disposed parallel to the plurality of racks, the other one is provided with a protruding portion, the protruding portion is at least partially disposed in the guide groove, and the protruding portion is capable of sliding along the guide groove.

5. The aperture module according to claim 1, wherein the driving member comprises a coil and a magnetic member, one of the coil and the magnetic member is connected to the base, the other one is connected to the gear carrier, the coil drives the magnetic member to move relative to the base, and the magnetic member drives the gear carrier to move.

6. The aperture module according to claim 5, wherein the gear carrier has a drive mounting block, and the drive mounting block protrudes towards the base;

the base has a second avoidance opening, the second avoidance opening is opposite to the drive mounting block, and the drive mounting block is at least partially disposed in the second avoidance opening; and in a case that the gear carrier moves relative to the base, the drive mounting block moves along the second avoidance opening.

7. The aperture module according to claim 1, wherein the side of each blade close to the light entering hole is provided with an arc-shaped notch, the arc-shaped notches in the plurality of blades define the light entering hole, and the center of the light entering hole coincides with a center of the light passing hole.

8. A camera module, comprising an aperture module, wherein the aperture module comprises a base, a blade group, a gear carrier, and a driving member, wherein a light passing hole is formed in the base;

the blade group is disposed on the base, the blade group comprises a plurality of blades, the plurality of blades are distributed around the light passing hole, and a light entering hole opposite to the light passing hole is formed among the plurality of blades;

for each blade, a gear is disposed on the blade, and the blade is capable of rotating around the gear in a direction towards or away from a center of the light entering hole;

the gear carrier is movably disposed on the base, the gear carrier is provided with a plurality of racks, and the gear carrier is meshed with the gears through the racks; wherein the plurality of racks are disposed in parallel, and rack grooves corresponding to the plurality of racks face the same direction;

the driving member is connected to the gear carrier, and the driving member is capable of driving the gear carrier to move relative to the base; and in a process in which the gear carrier moves relative to the base, the gear carrier drives the blades in the blade group to rotate relative to the base in the direction towards or away from the center of the light entering hole, so as to adjust a size of the light entering hole.

9. The camera module according to claim 8, wherein the gear carrier has a first avoidance opening, the gear carrier and the base are superposed in a light passing direction of the light passing hole, the first avoidance opening is opposite to the light passing hole, there is a mounting gap between the gear carrier and the base, and the blade group is disposed in the mounting gap.

10. The camera module according to claim 9, wherein the side of the gear carrier facing the base is provided with a convex block, the convex block is supported by the base, and a mounting gap is formed between the gear carrier and the base; and/or the side of the base facing the gear carrier is provided with a convex block, the convex block is supported by the gear carrier, and a mounting gap is formed between the base and the gear carrier; and the blade comprises a light-shielding portion, the light-shielding portion is connected to the gear, and the gear is capable of driving the light-shielding portion to rotate along the mounting gap in a direction towards or away from the center of the light entering hole.

11. The camera module according to claim 8, wherein one of the base and the gear carrier is provided with a guide groove, the guide groove is disposed parallel to the plurality of racks, the other one is provided with a protruding portion, the protruding portion is at least partially disposed in the guide groove, and the protruding portion is capable of sliding along the guide groove.

12. The camera module according to claim 8, wherein the driving member comprises a coil and a magnetic member, one of the coil and the magnetic member is connected to the base, the other one is connected to the gear carrier, the coil drives the magnetic member to move relative to the base, and the magnetic member drives the gear carrier to move.

13. The camera module according to claim 12, wherein the gear carrier has a drive mounting block, and the drive mounting block protrudes towards the base;

the base has a second avoidance opening, the second avoidance opening is opposite to the drive mounting block, and the drive mounting block is at least partially disposed in the second avoidance opening; and in a case that the gear carrier moves relative to the base, the drive mounting block moves along the second avoidance opening.

14. The camera module according to claim 8, wherein the side of each blade close to the light entering hole is provided with an arc-shaped notch, the arc-shaped notches in the plurality of blades define the light entering hole, and the center of the light entering hole coincides with a center of the light passing hole.

15. An electronic device, comprising the camera module according to claim 8.

* * * * *